(12) United States Patent
Bischoff et al.

(10) Patent No.: US 12,285,866 B2
(45) Date of Patent: Apr. 29, 2025

(54) METHOD AND DEVICE FOR ASCERTAINING CONTROL PARAMETERS IN A COMPUTER-ASSISTED MANNER FOR A FAVORABLE ACTION OF A TECHNICAL SYSTEM

(71) Applicant: Siemens Aktiengesellschaft, Munich (DE)

(72) Inventors: Martin Bischoff, Großhelfendor (DE); Michel Tokic, Tettnang (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 856 days.

(21) Appl. No.: 17/256,128

(22) PCT Filed: Jun. 19, 2019

(86) PCT No.: PCT/EP2019/066145
§ 371 (c)(1),
(2) Date: Dec. 24, 2020

(87) PCT Pub. No.: WO2020/002072
PCT Pub. Date: Jan. 2, 2020

(65) Prior Publication Data
US 2021/0122038 A1    Apr. 29, 2021

(30) Foreign Application Priority Data
Jun. 28, 2018   (EP) .................................... 18180479

(51) Int. Cl.
B25J 9/16    (2006.01)
(52) U.S. Cl.
CPC ............. B25J 9/163 (2013.01); B25J 9/1671 (2013.01)

(58) Field of Classification Search
CPC .................... B25J 9/163; B25J 9/1671; G05B 2219/39406; G05B 2219/40494
See application file for complete search history.

(56) References Cited

U.S. PATENT DOCUMENTS 9,597,797 B2 *  3/2017  Ponulak .................... B25J 9/161
9,811,074 B1 *  11/2017 Aichele .................. B25J 9/1656
(Continued)

FOREIGN PATENT DOCUMENTS

| CN | 101573667 A | 11/2009 |
|---|---|---|
| CN | 106662847 A | 5/2017 |

(Continued)

OTHER PUBLICATIONS

CN-110216671-A translation (Year: 2019).*
(Continued)

*Primary Examiner* — Kyle T Johnson
(74) *Attorney, Agent, or Firm* — Schmeiser, Olsen & Watts LLP

(57) ABSTRACT

A method and a device for ascertaining control parameters in a computer-assisted manner for handling a technical system is provided. A starting state and the surroundings of the technical system are detected using at least one sensor, and a physical simulation model of the technical system is generated using same. On the basis of the starting state, different combinations of handling steps of the technical system are simulated with respect to a specified target state using the simulation model, wherein control parameters of the technical system for carrying out the handling steps are varied. The simulation data is used to train a machine learning routine by means of an evaluation of each handling step, and the trained machine learning routine is used to ascertain an optimized combination of handling steps. The control parameters of the optimized combination of handling (Continued)

steps are output to control the technical system is also provided.

14 Claims, 3 Drawing Sheets

(56) References Cited

U.S. PATENT DOCUMENTS

| | | | | |
|---|---|---|---|---|
| 11,813,753 | B2* | 11/2023 | Wang | B25J 9/1676 |
| 2008/0125893 | A1* | 5/2008 | Tilove | B25J 9/1666 |
| | | | | 700/103 |
| 2010/0070098 | A1 | 3/2010 | Sterzing et al. | |
| 2017/0160706 | A1 | 6/2017 | Düll et al. | |
| 2018/0354126 | A1* | 12/2018 | Ueda | B25J 9/163 |
| 2019/0126472 | A1* | 5/2019 | Tunyasuvunakool | |
| | | | | G06N 3/084 |
| 2019/0308315 | A1* | 10/2019 | Radrich | B25J 9/163 |
| 2019/0314989 | A1* | 10/2019 | Sokabe | B25J 9/1664 |
| 2019/0385022 | A1* | 12/2019 | Jang | G06F 18/214 |
| 2019/0389066 | A1* | 12/2019 | Jung | B25J 9/1661 |
| 2020/0061820 | A1* | 2/2020 | McDaniel | B25J 9/1671 |
| 2020/0279134 | A1* | 9/2020 | Bousmalis | G06F 18/2431 |
| 2021/0122038 | A1* | 4/2021 | Bischoff | B25J 9/163 |
| 2021/0387343 | A1* | 12/2021 | Imajo | G06N 3/045 |
| 2022/0016763 | A1* | 1/2022 | Chen | B25J 9/163 |
| 2022/0063103 | A1* | 3/2022 | Oh | B25J 5/00 |
| 2022/0105636 | A1* | 4/2022 | Oboril | B25J 9/1676 |
| 2022/0297295 | A1* | 9/2022 | Aparicio Ojea | B25J 9/1664 |
| 2024/0058963 | A1* | 2/2024 | Fang | B25J 13/06 |

FOREIGN PATENT DOCUMENTS

| | | | | |
|---|---|---|---|---|
| CN | 110216671 | A * | 9/2019 | |
| CN | 111300431 | A * | 6/2020 | B25J 13/08 |
| CN | 114474004 | B * | 10/2023 | |
| WO | 2018087546 | A1 | 5/2018 | |

OTHER PUBLICATIONS

CN-111300431-A translation (Year: 2020).*
CN-114474004-B translation (Year: 2023).*
Graphical_Simulation_for_Sensor_based_robot_programming.pdf (Year: 1992).*
SwarmsimX_real_time_simulation_environment_for_multi-robot_systems.pdf (Year: 2012).*
Gautam Ajay et al: "Stabilizing model predictive control using parameter-dependent dynamic policy for nonlinear systems modeled with neural networks", Journal of Process Control, Oxford, GB, vol. 36, pp. 11-21, XP029309432, ISSN: 0959-1524, DOI: 10.1016/J.JPROCONT.2015.09.003; pp. 1-9; the whole document; 2015; 11 pages.
Sompura Jay N et al: "Experimental study: Neural network based model predictive control of a distributed parameter system", 2016 12th IEEE International Conference on Control and Automation (ICCA), IEEE, pp. 529-534, XP032919061, DOI: 10.1109/ICCA.2016.7505331 Technical Fields [retrieved on Jul. 5, 2016]; the whole document; 2016; 6 pages.
International Search Report and Written Opinion to corresponding PCT Patent Application No. PCT/EP2019/066145 dated Oct. 7, 2019. 16 pages.

* cited by examiner

METHOD AND DEVICE FOR ASCERTAINING CONTROL PARAMETERS IN A COMPUTER-ASSISTED MANNER FOR A FAVORABLE ACTION OF A TECHNICAL SYSTEM

CROSS-REFERENCE TO RELATED APPLICATIONS

This application claims priority to PCT Application No. PCT/EP2019/066145, having a filing date of Jun. 19, 2019, which is based off of European Patent Application No. 18180479.0, having a filing date of Jun. 28, 2018, the entire contents both of which are hereby incorporated by reference.

FIELD OF TECHNOLOGY

The following relates to a method and a device for ascertaining control parameters in a computer-assisted manner for a favorable action of a technical system, in particular an autonomous technical system such as for example an autonomous robot.

BACKGROUND

By means of autonomous technical systems, such as for example autonomous robots, objects can be manipulated. The gripping of an object by an end effector of a robot may be mentioned here as an example. Conventional control methods are based for example on the detection of the object and the surrounding area and the technical system in it by sensors and the ascertainment of a suitable sequence of actions or path for gripping the object by means of path planning algorithms. Thus, conventional methods can typically only consider an actual state of a surrounding area of a technical system and can only forecast with difficulty how, on the basis of physical laws, its actions influence the surrounding area.

For example, so-called simultaneous localization and mapping methods, also known as SLAM methods, may be used, the surrounding area of an autonomous technical system being detected or estimated by means of sensor data. In particular, the position and alignment of the autonomous technical system itself is detected, and possibly further objects in the surrounding area. By means of path planning algorithms, which are typically based on mathematical and/or numerical methods, a permissible and favorable path or sequence of action steps for the autonomous technical system can be ascertained. However, such methods generally do not take into account any consequences of an action of the autonomous technical system or further physical effects.

Thus, an embodiment of the present invention provides a possibility for ascertaining favorable action steps for a technical system while taking its surrounding area into account.

SUMMARY

Aspects relate to a method, a device and a computer program product (non-transitory computer readable storage medium having instructions, which when executed by a processor, perform actions).

An embodiment of the present invention concerns a method for ascertaining control parameters in a computer-assisted manner for a favorable action of a technical system, comprising the method steps of:

detecting an initial state and a surrounding area of the technical system by means of at least one sensor;
generating a physical simulation model of the technical system and its surrounding area;
ascertaining a target state for the technical system;
simulating various combinations of action steps of the technical system by means of the physical simulation model, on the basis of the initial state and with respect to the target state, control parameters of the technical system for carrying out the action steps being varied, and outputting respective resultant simulation data;
training a machine learning routine on the basis of the respective resultant simulation data and by means of an evaluation of a respective action step;
ascertaining an optimized combination of action steps on the basis of the trained machine learning routine, the optimized combination of action steps being assigned a favorable evaluation; and
outputting the control parameters of the optimized combination of action steps for controlling the technical system.

It is an advantage of the embodiment of the present invention that, by means of a computer-aided simulation in combination with a machine learning routine, an action or a sequence of actions or path for a technical system can be determined in a quick and efficient way, since in particular physical effects, such as for example gravitation or collision, and physical variables can be taken into account in the ascertainment of an optimized combination of action steps. The machine learning routine can ascertain favorable action steps that use physical effects, such as for example interactions with the surrounding area, since the machine learning routine is trained by means of simulation data. In particular, a physical simulation model can be created and used instead of a conventional SLAM method. Path planning can take place in particular by repeatedly carrying out the physical simulation with different paths, i.e. for example different possibilities for activating the technical system by means of different control parameters, within a machine learning process. The control parameters, for open-loop or closed-loop control, including in particular control commands or instructions for controlling the technical system. A positive evaluation of the paths for example allows optimized path planning to be achieved, since for example physical laws can be included in the planning. As a result, the determination of a favorable action sequence is in particular flexible, since for example the sequence of the action steps is not rigidly stipulated.

A technical system may be in particular an autonomous technical system, such as for example an autonomous robot. Ascertaining a combination of action steps may be understood in particular as meaning planning a sequence of actions, action planning or path planning, the individual action steps being controlled by means of control parameters. An action step may be understood in particular as meaning an action or a movement of the technical system.

A machine learning routine may be understood as meaning a machine learning method, such as for example a neural network. In particular, a method for supervised learning, such as for example for reinforcement learning, may be used. The machine learning routine is trained on the basis of an initial state of the technical system, ascertained by means of at least one sensor, and with respect to a target state. In other words, a target state is specified for training the machine learning routine and the machine learning routine is trained in such a way that it ascertains on the basis of an initial state a combination of action steps that lead to the target state.

The target state may for example be specified and/or read in as a data record. Various combinations of action steps on the basis of the initial state may lead to the target state, while some of the different combinations may be more favorable. The various action steps can be simulated in a computer-assisted manner by means of the simulation model and simulation data respectively output. The simulation data may include in particular values of the control parameters, states, actions and reactions of the technical system and physical effects and variables of the technical system and its surrounding area.

Each action step and/or its effect may be evaluated or each action step may be respectively assigned an evaluation. The machine learning routine may be trained in particular on the basis of the evaluations that are respectively assigned to an action step, such as for example by means of a reward function. In particular, favorable action steps may be preferred, while the term "favorable" may be understood in connection with the embodiment of the present invention as meaning for example advantageous, usable, suitable, advisable, efficient, energy-efficient, quick, by short order, or the like. The ascertainment of a combination of favorable action steps may for example take place by a comparison of the overall evaluation of the various combinations of action steps, while that combination with a favorable overall evaluation can be selected.

In an advantageous embodiment of the method, the machine learning routine may be trained as soon as simulation data of at least one combination of action steps are available.

It may in particular be advantageous to carry out the computer-assisted simulation of the technical system and the training of the machine learning routine in parallel. In particular, a number of simulations may be calculated in parallel. For example, a parallel calculation may be carried out on more than one computing unit, such as for example graphics processors. This allows for example a quick and efficient ascertainment of a favorable combination of action steps to be achieved.

In a further advantageous embodiment of the method, the simulation of the technical system and the training of the machine learning routine may be carried out for more than one target state and/or for more than one initial state and a combination of action steps with a favorable evaluation respectively ascertained and stored in a memory unit.

For example, more than one machine learning routine may be trained by means of simulation data in relation to various initial states and with respect to various target states and a combination of action steps that is assigned a favorable evaluation respectively stored. Consequently, for various states of the technical system a corresponding trained machine learning routine may be stored, so that it can be quickly accessed, if for example a corresponding initial state of the technical system is detected. It is also possible to simulate similar actions, to train a corresponding machine learning routine and to use it for future cases of training, so that the calculation time can be shortened. A memory unit may be in particular a database.

In a further advantageous embodiment of the method, control parameters for an optimized combination of action steps with a favorable evaluation in dependence on a target state may be stored in a memory unit.

A combination of action steps that is assigned a favorable evaluation may be ascertained on the basis of a trained machine learning routine and the corresponding control parameters for the technical system that control these action steps may be stored in a database. Thus, these may be used for example for a future action with an identical initial state and target state.

In a further advantageous embodiment of the method, the control parameters for an optimized combination of action steps may be transferred to the technical system.

The control parameters may be transferred to the technical system for controlling the technical system, so that the technical system can carry out the combination of action steps. Only control parameters that are assigned a favorable evaluation may be transferred to the technical system for controlling a combination of action steps.

In a further advantageous embodiment of the method, the target state may be ascertained dependent on the detected initial state and/or the detected surrounding area of the technical system.

An initial state may be ascertained by means of at least one sensor and, dependent thereon, a target state determined. For example, a target state may be assigned to an initial state or a target state may be selected from a set of specified target states. The detection of an object by means of a camera may be mentioned as an example, the target state, for example "gripping the object", being specified dependent on the detection.

In a further advantageous embodiment of the method, the evaluation of an action step may be carried out dependent on a result of an action step and/or with respect to the target state.

An action step of the technical system, such as for example an action of an end effector, may be evaluated dependent on the result, or else an effect, of the action. In particular, the evaluation may be assigned to the action step. An evaluation may take place in particular dependent on an ascertained target state.

In a further advantageous embodiment of the method, the physical simulation model may be constructed dependent on the target state and/or on the surrounding area and/or on a type of the technical system.

The complexity and/or the dimension of the simulation model and of the computer-assisted simulation may be chosen dependent on the target state and/or on the surrounding area and/or on the type of the technical system.

In a further advantageous embodiment of the method, the surrounding area and the initial state of the technical system may be continuously detected by means of a sensor and the physical simulation model may be continuously updated by means of the sensor data.

A current initial state and the surrounding area of the technical system are monitored by means of a sensor continuously or at specified points in time, so that the physical simulation model can be correspondingly adapted.

In a further advantageous embodiment of the method, the physical properties of an object in the surrounding area of the technical system may be detected as parameter data, stored in a memory unit and integrated in the physical simulation model.

In addition to the object detection, physical properties or parameters of an object in for example a database may be enquired. For example, physical variables, such as for example the weight, or material properties, of an object in the surrounding area of the technical system may be detected in advance and stored in a memory unit. The physical properties may be used in particular as parameter data, or else as input data, for the simulation model. Consequently, for example, physical effects, such as for example the falling of an object in the Earth's gravitational field, may be simulated in detail.

In a further advantageous embodiment of the method, various combinations of action steps of the technical system may be simulated temporally in parallel on more than one computing unit.

The computer-assisted simulation and/or the training of a machine learning routine may be carried out in parallel, such as for example on graphics processors (graphics processing units, GPUs for short). This allows in particular a quick and efficient calculation of a combination of favorable action steps.

A further embodiment of the present invention concerns a device for ascertaining control parameters in a computer-assisted manner for a favorable action of a technical system, comprising:
- at least one sensor for detecting an initial state and a surrounding area of the technical system;
- a generating module for generating a physical simulation model of the technical system and its surrounding area;
- a target module for ascertaining a target state for the technical system;
- a simulation model for simulating various combinations of action steps of the technical system by means of the physical simulation model, on the basis of the initial state and with respect to the target state, control parameters of the technical system for carrying out the action steps being varied, and outputting respective resultant simulation data;
- a training module for training a machine learning routine on the basis of the respective resultant simulation data by means of an evaluation of a result of a respective action step;
- an optimizing module for ascertaining an optimized combination of action steps on the basis of the trained machine learning routine, the optimized combination of action steps being assigned a favorable evaluation; and
- an output module for outputting the control parameters of the optimized combination of action steps for controlling the technical system.

The device may in particular be integrated in a technical system or coupled to it.

In an advantageous embodiment, the device includes a transfer module for transferring the control parameters to the technical system.

In a further advantageous embodiment, the device includes a memory unit and/or at least one computing unit.

A memory unit may be for example a database. A computing unit may be in particular a processor or a graphics processor.

Furthermore, the embodiment of the present invention includes a computer program product, which can be loaded directly into a programmable computer, comprising program code parts that are suitable for carrying out the steps of the method according to the present invention.

BRIEF DESCRIPTION

Some of the embodiments will be described in detail, with reference to the following figures, wherein like designations denote like members, wherein.

DETAILED DESCRIPTION

Objects corresponding to one another are provided with the same reference signs in all of the figures.

Figure 1:
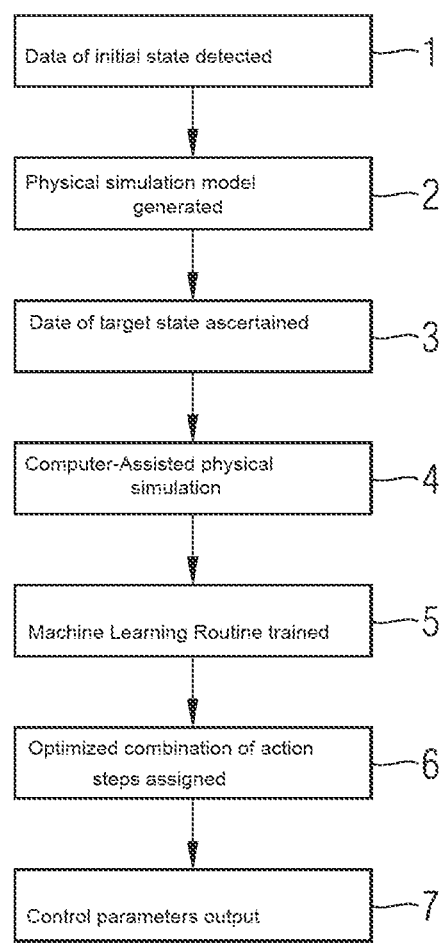
FIG. 1 depicts a flow diagram of a method for ascertaining control parameters in a computer-assisted manner for a favorable action of a technical system.

FIG. 1 schematically shows a flow diagram of a method according to the embodiment of the present invention for ascertaining control parameters in a computer-assisted manner for a favorable action of a technical system comprising the following method steps.

Hereinafter, a technical system may be in particular an autonomous technical system, such as for example an autonomous robot in an industrial environment. The technical system may carry out individual action steps of an action, in order, on the basis of an initial situation, to achieve an ascertained target state. The action steps are specified by means of control parameters, i.e. the technical system is controlled by means of the control parameters.

In step 1 of the method according to the embodiment of the present invention, data of an initial state of the technical system and its surrounding area are detected by means of at least one sensor. The at least one sensor may be part of the technical system, coupled to it or assigned to it. For example, the technical system may be an industrial robot in a production plant, the current position, alignment and surrounding area of which are detected by means of a camera. The surrounding area may be for example the direct surrounding area in a specified radius of action of the technical system. Properties and/or state variables of the surrounding area may be in particular objects located there or physical variables such as room height or temperature.

In step 2, a physical simulation model of the technical system and its surrounding area is generated on the basis of the data detected by the at least one sensor. In particular, a physical simulation model of the technical system may already be created in advance, and is only adapted by means of the detected data as input data. The simulation model is in particular a physical simulation model, natural laws, such as for example gravitation, being implemented.

The complexity and/or the domain and/or dimension of the physical simulation model may be chosen dependent on the target state and/or on the surrounding area and/or on the type of the technical system. For example, it is conceivable that a simulation of the rigid-body mechanics is used in order to simulate the gripping of a fixed object by a robot. Depending on the area of use of the technical system, the simulation may be set up from other physical domains. For example, an autonomous technical system may carry out a chemical, hydrodynamic or financial process, so that a corresponding domain-specific simulation can be constructed in order to forecast the effects of the actions of the technical system.

In step 3, data of a target state are ascertained and read in. The target state may for example take the form of a parameter data record or a vector and describes in particular the result state of an action. In particular, the target state may be specified and/or ascertained on the basis of the detected initial situation. A target state may for example indicate that an object is to be gripped by the technical system with an end effector, an initial state describing for example the object in the surrounding area of the technical system.

In step 4, a computer-assisted physical simulation of the technical system is carried out, for example on one or more processors. For this purpose, the data of the initial state, data of the surrounding area and data of the target state are read in and, on the basis of this, a simulation is set up. In particular, at least one combination of action steps of the technical system is simulated, the simulation being started on the basis of the initial state and the action steps being chosen in such a way that the specified target state is achieved by the technical system.

Furthermore, physical properties of objects in the surrounding area, which are stored for example as parameter data in a database, may be read in and taken into account in the simulation model. For example, the size of an object to be gripped may be detected by means of a sensor. For this purpose, for example, the nature of the surface or the weight may be ascertained by means of a collection of physical properties of the object and used in the simulation.

It is also possible that various combinations of action steps, on the basis of an initial state, can achieve the target state. For example, an autonomous robot may turn a movable robot arm about various axes and thereby reach a target position on various paths. The various combinations of action steps are simulated by means of the physical simulation, control parameters being correspondingly varied for controlling the various action steps. Subsequently, the simulation data of the respective combination of action steps are output. The simulation data may be used as training data for training a machine learning method.

The simulation data may also include in particular information about the interaction with the surrounding area. For example, when seizing an object by a robot, it may be advisable to allow the object initially to bounce off, before it is caught and gripped. The interaction with a wall, i.e. the surrounding area, and the action steps resultant from it can be calculated by means of the physical simulation.

In step 5, a machine learning routine is trained on the basis of the respective simulation data. A learning routine may be for example a neural network, which is trained by means of reinforcement learning. The training may take place by means of an evaluation of a respective action step. For example, an action step may be evaluated dependent on a result of an action step and/or with respect to the target state. An evaluation may in particular indicate whether an action step is favorable.

The machine learning routine may in particular be trained as soon as first simulation data of a combination of action steps have been calculated and are available. The simulation and the training of the machine learning routine may be calculated almost in parallel.

In step 6, an optimized combination of action steps to which a favorable evaluation is assigned may be ascertained by means of the trained machine learning routine, while "optimized" can also be understood as meaning "close to an optimum". In other words, a sequence of action steps that are for example particularly favorable can be ascertained. The ascertainment may take place for example on the basis of a comparison of the overall evaluation of one combination of action steps with the overall evaluations of other combinations of action steps. In particular, a favorable action for the technical system can be ascertained by means of the trained machine learning routine, while for this purpose a target state is specified and sensor data of an initial state and a surrounding area of the technical system are ascertained.

In step 7, the control parameters that are assigned to the optimized combination of action steps may be output for controlling the technical system. The control parameters may be transmitted to the technical system, in order that the latter can carry out the favorable combination of action steps.

Figure 2:
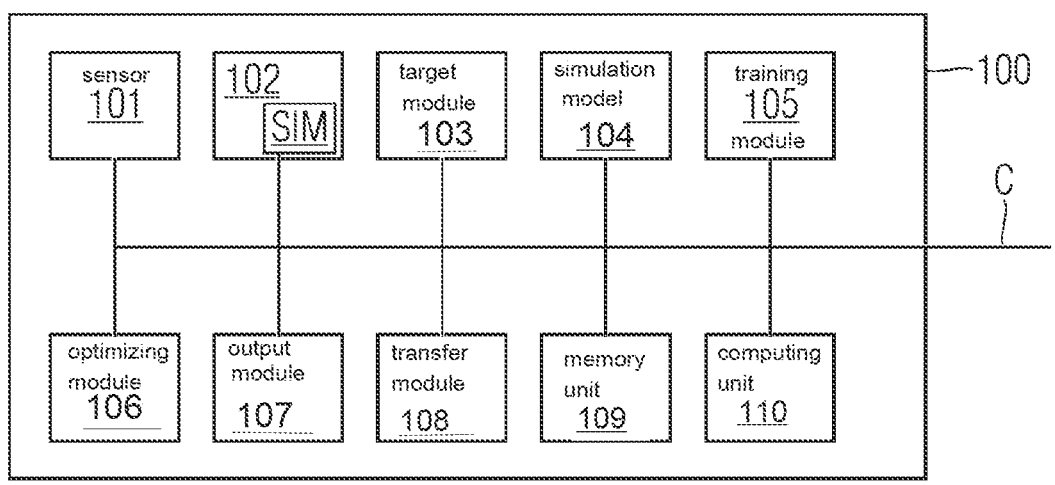
FIG. 2 depicts a schematic representation of a method for ascertaining control parameters in a computer-assisted manner for a favorable action of a technical system.

FIG. 2 schematically shows a device 100 according to the embodiment of the present invention in block representation. The device 100 may for example be integrated in a technical system or be coupled to it by way of a communication connection C.

The device 100 includes at least one sensor 101 and/or is coupled to at least one sensor of the technical system. Furthermore, the device 100 includes a generating module 102 for generating a physical simulation model SIM of the technical system and its surrounding area, a target module 103, a simulation module 104, a training module 105 for training a machine learning routine, an optimizing module 106 for ascertaining an optimized combination of action steps on the basis of the machine learning routine, an output module 107, a transfer module 108, at least one memory unit 109 and at least one computing unit 110. The modules and/or units are coupled to one another. In particular, the individual units of a device 100 according to the embodiment of the present invention may be individually fitted in various systems and coupled to one another, such as for example a number of sensors that are installed in the surrounding area of the technical system TS and communicate with the other units.

By means of the generating module 102, a physical simulation model SIM of the technical system is generated, while a complexity, a domain and a dimension of the simulation model may be dependent on the detected initial state and/or the surrounding area. By means of the target module 103, a target state for the technical system is read in. The target state is intended to be achieved by a combination of action steps on the basis of an initial state and dependent on the surrounding area of the technical system. The control of the technical system takes place by way of control parameters, at least one control parameter defining an action step.

In the simulation module 104, the simulation model SIM is used for simulating various combinations of action steps, on the basis of the initial state and with respect to the target state. For example, there can also be a number of simulations carried out in parallel on more than one computing unit 110. It is also possible for at least one simulation to be carried out respectively for various initial states and/or various target states and the respective simulation data to be output.

In the training module 105, the simulation data are used as training data for training a machine learning routine, to ascertain favorable combinations of action steps. For this purpose, the individual simulated action steps of a combination of action steps are evaluated, such as for example dependent on the respective result of an action step. This produces a machine learning routine that is trained by means of the simulation data and can output a combination of action steps with a favorable evaluation. The trained machine learning routine may be output by the training module 105 to the optimizing module 106. The ascertainment of a favorable combination of action steps takes place in the optimizing module 106. In the optimizing module 106, the trained machine learning method is applied, for example to sensor data of the initial state and of the surrounding area, in order to ascertain a favorable combination of action steps.

The control parameters for controlling the selected combination of action steps are output to the technical system by the output module 107 and are transferred to it for carrying out the action steps by the transfer module 108.

In the memory unit 109, simulation data and/or control parameters can be stored. For example, various simulations can be carried out for various initial states and/or target states. On the basis of these simulation data, at least one machine learning routine can be trained and, on the basis of the trained machine learning routine, favorable combinations of action steps can be ascertained.

The at least one computing unit 110 may be for example a processor or a graphics processor, on which for example a computer program product according to the embodiment of the present invention can carry out steps of a method according to the present invention. In particular, a number of computing units (not represented) may be used for a parallel simulation and/or training of the machine learning routine.

The device 100 may be used in particular for controlling an autonomous technical system, favorable action steps for achieving a specified target state being ascertained by means of a machine learning routine and a physical simulation.

Figure 3:
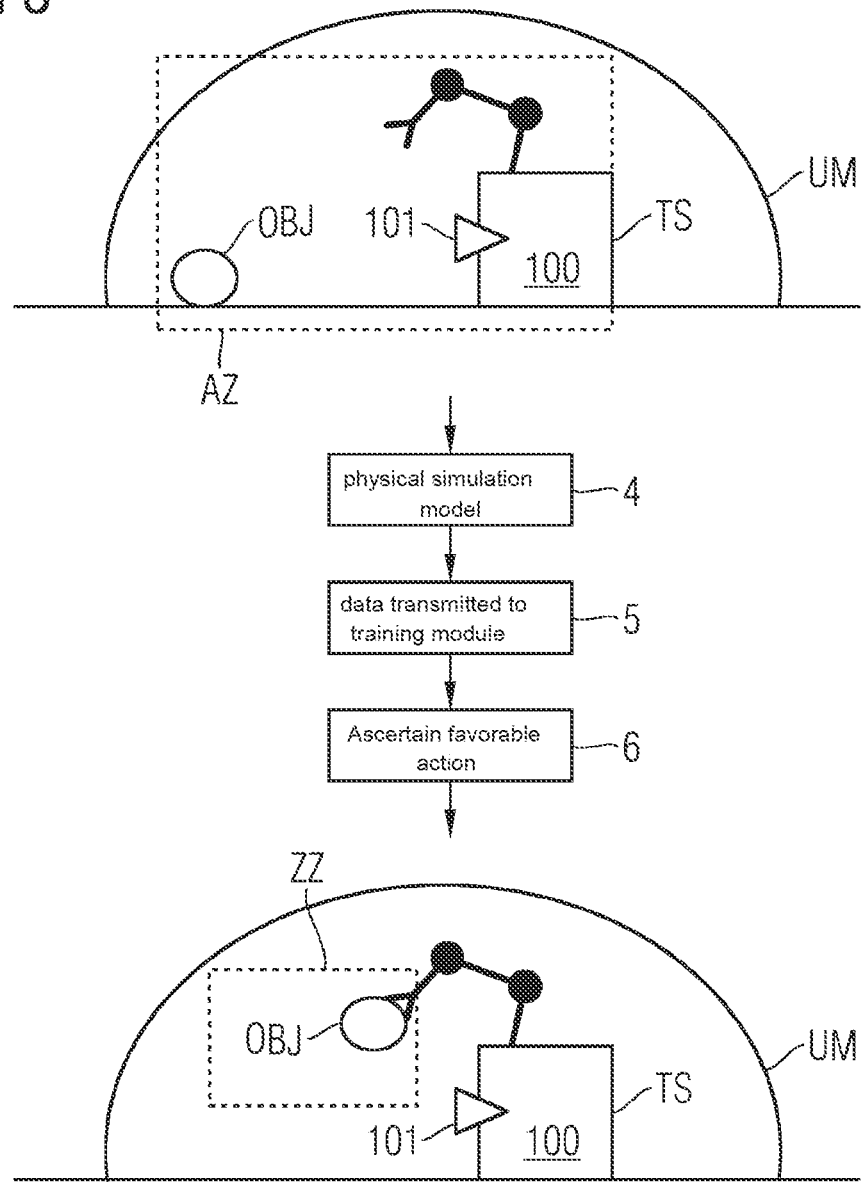
FIG. 3 depicts a schematic representation of a device for ascertaining control parameters in a computer-assisted manner for a favorable action of a technical system.

FIG. 3 schematically shows an exemplary embodiment of a method according to the embodiment of the present invention. Represented as the technical system TS is an autonomous robot, which is controlled by means of a device 100 according to the present invention in such a way that it can carry out an optimized combination of favorable action steps. The autonomous robot includes a sensor 101, such as for example a camera, with which the position and alignment of the autonomous robot and its surrounding area UM can be detected. The camera is coupled to the device 100. For example, the camera 101 merely detects a specified region of the surrounding area of the robot TS, such as for example its area of action. The detected data of the surrounding area UM and the alignment of the robot TS are provided as input data for the computer-assisted simulation. Furthermore, an object OBJ may be detected in the surrounding area of the robot. The data of an initial state AZ includes for example the object OBJ and the position of the robot arm.

A target state ZZ is specified, such as for example the picking up and gripping of the object OBJ by the robot arm.

In the device 100, a computer-assisted physical simulation of the robot and its surrounding area is carried out on the basis of the initial state AZ and with respect to the target state ZZ, see step 4. For this purpose, the detected data of the initial state AZ and the surrounding area UM and the data of the target state ZZ are read in and a simulation model is created. In particular, the simulation model includes physical properties of the technical system TS and its surrounding area UM. In addition, physical properties for a detected object OBJ, such as for example the weight, may be retrieved from a database and used in the simulation model.

The simulation data are transmitted to the training module 105 of the device 100, in order to train a machine learning routine in such a way as to ascertain a combination of favorable action steps, see steps 5 and 6. The machine learning routine is trained on the basis of the simulation data as training data. For this purpose, the individual simulated action steps are respectively evaluated. For example, an action step is evaluated on the basis of its result. On the basis of the trained machine learning routine, a favorable combination of action steps can be ascertained. A favorable combination of action steps may for example includes quick and energy-efficient gripping of the object OBJ by the robot TS as a result.

The ascertained combination of favorable action steps is transferred to the robot arm and carried out by it by means of the corresponding control parameters. The robot arm carries out the individual action steps, so that the specified target state ZZ is achieved.

All of the features described and/or depicted can be advantageously combined with one another within the scope of the embodiment of the present invention. The present invention is not restricted to the exemplary embodiments described.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

What is claimed:

1. A method for ascertaining control parameters in a computer-assisted manner for a favorable action of a technical system, the method comprising:
   detecting an initial state and a surrounding area of the technical system by at least one sensor;
   generating a physical simulation model of the technical system and the surrounding area on the basis of sensor data detected by the at least one sensor, wherein the surrounding area and the initial state of the technical system are continuously detected by the at least one sensor and the physical simulation model is continuously updated by the sensor data;
   adapting the physical simulation model based on the sensor data as input data;
   ascertaining a specified target state for the technical system, wherein various combinations of action steps on the basis of the initial state are configured to lead to the specified target state;
   simulating the various combinations of action steps of the technical system by the physical simulation model, on a basis of the initial state and with respect to the specified target state, control parameters of the technical system for carrying out the action steps being varied, and outputting respective resultant simulation data;
   training a machine learning routine on a basis of the respective resultant simulation data and by an evaluation of a respective action step;
   ascertaining an optimized combination of action steps on a basis of the trained machine learning routine, the optimized combination of action steps being assigned a favorable evaluation; and
   outputting the control parameters of the optimized combination of action steps for controlling the technical system.

2. The method as claimed in claim 1, wherein the machine learning routine is trained as soon as simulation data of at least one combination of action steps are available.

3. The method as claimed in claim 1, wherein the simulation of the technical system and the training of the machine learning routine are carried out for more than one target state and/or for more than one initial state and a combination of action steps with a favorable evaluation is respectively ascertained and stored in a memory unit.

4. The method as claimed in claim 1, wherein control parameters for an optimized combination of action steps with a favorable evaluation in dependence on the specified target state are stored in a memory unit.

5. The method as claimed in claim 1, wherein the control parameters for an optimized combination of action steps are transferred to the technical system.

6. The method as claimed in claim 1, wherein the specified target state is ascertained dependent on the detected initial state and/or the detected surrounding area of the technical system.

7. The method as claimed in claim 1, wherein the evaluation of an action step is carried out dependent on a result of an action step and/or with respect to the specified target state.

8. The method as claimed in claim 1, wherein the physical simulation model is constructed dependent on the specified target state and/or on the surrounding area and/or on a type of the technical system.

9. The method as claimed in claim 1, wherein physical properties of an object in the surrounding area of the technical system are detected as parameter data, stored in a memory unit and integrated in the physical simulation model.

10. The method as claimed in claim 1, wherein various combinations of action steps of the technical system are simulated temporally in parallel on more than one computing unit.

11. A non-transitory computer program product, comprising a non-transitory computer readable hardware storage device having computer readable program code stored therein, said program code executable by a processor of a computer system to implement the method as claimed in claim 1.

12. A device for ascertaining control parameters in a computer-assisted manner for a favorable action of a technical system, the device comprising:
   at least one sensor for detecting an initial state and a surrounding area of the technical system;
   a generating module for generating a physical simulation model of the technical system and the surrounding area on the basis of sensor data detected by the at least one sensor, wherein the surrounding area and the initial state of the technical system are continuously detected by the at least one sensor and the physical simulation model is continuously updated by the sensor data, wherein the physical simulation model is adapted based on the sensor data as input data;
   a target module for ascertaining a specified target state for the technical system, wherein various combinations of action steps on the basis of the initial state are configured to lead to the specified target state;
   a simulation module for simulating the various combinations of action steps of the technical system by the physical simulation model, on a basis of the initial state and with respect to the specified target state, control parameters of the technical system for carrying out the action steps being varied, and outputting respective resultant simulation data;
   a training module for training a machine learning routine on a basis of the respective resultant simulation data by an evaluation of a result of a respective action step;
   an optimizing module for ascertaining an optimized combination of action steps on a basis of the trained machine learning routine, the combination of action steps being assigned a favorable evaluation; and
   an output module for outputting the control parameters of the optimized combination of action steps for controlling the technical system.

13. The device as claimed in claim 12 comprising a transfer module for transferring the control parameters to the technical system.

14. The device as claimed in claim 12 comprising at least one memory unit and/or at least one computing unit.

* * * * *